United States Patent [19]

Black

[11] 4,271,789
[45] Jun. 9, 1981

[54] ENERGY CONVERSION SYSTEM

[76] Inventor: Robert B. Black, 2925 Denver St., Corpus Christi, Tex. 78404

[21] Appl. No.: 46,240

[22] Filed: Jun. 7, 1979

Related U.S. Application Data

[60] Continuation-in-part of Ser. No. 813,667, Jul. 7, 1977, Pat. No. 4,197,831, which is a continuation of Ser. No. 620,327, Oct. 7, 1975, abandoned, which is a continuation-in-part of Ser. No. 462,094, Apr. 18, 1974, Pat. No. 4,025,291, which is a division of Ser. No. 192,262, Oct. 26, 1971, Pat. No. 3,844,270, Continuation of Ser. No. 794,044, May 5, 1977, abandoned, which is a division of Ser. No. 568,699, Apr. 16, 1975, abandoned, which is a division of Ser. No. 369,084, Jun. 11, 1973, abandoned.

[51] Int. Cl.³ .............................................. F22B 5/00
[52] U.S. Cl. ...................................... 122/16; 122/43; 122/179; 126/350 R; 126/361
[58] Field of Search ................. 122/16, 49, 53, 140 R, 122/140 A, 42, 43, 179, 137, 138; 126/350 R, 391, 361; 431/182, 183

[56] References Cited

U.S. PATENT DOCUMENTS

| 2,558,971 | 7/1951 | Lundstrum | 122/16 X |
| 2,647,568 | 8/1953 | Sloan | 431/183 |
| 2,834,405 | 5/1958 | Voorheis | 431/183 X |
| 3,267,985 | 8/1966 | Kitchen | 431/1 |
| 3,302,684 | 2/1967 | Banko | 431/183 X |
| 3,709,473 | 1/1973 | Ito et al. | 126/350 R |
| 3,734,064 | 5/1973 | Cancilla et al. | 122/136 R |

FOREIGN PATENT DOCUMENTS

117516 of 1910 United Kingdom ............... 122/155 A

*Primary Examiner*—Edward G. Favors
*Attorney, Agent, or Firm*—Kenneth P. Synnestvedt

[57] ABSTRACT

A system for the conversion of the potential energy of hydrocarbon fuels to heat, the system being particularly adapted to the use of the available heat in the heating of a fluid, especially water. The system includes special forms of heat transfer devices by which the available heat, particularly of natural gas may be transferred to a water supply in a heat exchange device of special construction.

34 Claims, 17 Drawing Figures

ENERGY CONVERSION SYSTEM

CROSS REFERENCE

The present application is a Continuation-in-Part of my application Ser. No. 813,667 filed July 7, 1977, now U.S. Pat. No. 4,197,831, which in turn is a Continuation of application Ser. No. 620,327 filed Oct. 7, 1975, now abandoned, which in turn is a Continuation-in-Part of application Ser. No. 462,094 filed Apr. 18, 1974, and issued May 24, 1977 as U.S. Pat. No. 4,025,291, which in its turn is a Division of application Ser. No. 192,262 filed Oct. 26, 1971, and issued Oct. 29, 1974 as U.S. Pat. No. 3,844,270. The present application is also a Continuation-in-Part of my application Ser. No. 794,044 filed May 5, 1977, abandoned, which is a Division of Ser. No. 568,699 filed Apr. 16, 1975, now abandoned, which in its turn is a Division of application Ser. No. 369,084 filed June 11, 1973, now abandoned.

Certain aspects of the subject matter are also related to the subject matter of my U.S. Pat. No. 3,699,079 which was filed Aug. 6, 1970 and which issued June 13, 1972 as U.S. Pat. No. 3,669,079.

BACKGROUND AND STATEMENT OF INVENTION AND OBJECTS

All of my prior applications and patents above identified disclose certain features of energy conversion systems adapted to increase the efficiency of energy conversion, particularly the efficiency of conversion of energy of gaseous fuels such as natural gas; and all of said prior applications and patents disclose certain heat exchanger devices adapted to increase the efficiency of heat transfer from the products of combustion of petroleum fuels, especially natural gas, to fluids, particularly liquids such as water. In all of said prior applications and patents heat exchanger devices are disclosed and such devices are arranged to provide for indirect heat transfer from the products of combustion to the liquid or other fluid to be heated by means of tube-in-tube type heat exchangers in which conditions are established providing for cooling of the combustion products to a temperature below the dew point, in order to utilize the large amount of BTU's released upon condensation of the water vapor present in the products of combustion.

The present application also contemplates highly effective recovery of the BTU's by establishing conditions which will reduce the temperature of the products of combustion to a temperature below the dew point, before discharge of the gaseous products of combustion. The present invention, however, is concerned with a combination of a number of improvements and features which further enhance the efficiency and which also provide numerous additional advantages, most of which are described hereinafter in relation to individual embodiments of the equipment herein disclosed.

Before proceeding with more detailed description of the structural embodiments and features and advantages of the operation of systems according to the present invention, it is here first pointed out that while certain aspects of the invention are adaptable to use with a variety of fuels, the invention is especially adapted to the use of flammable gases, particularly natural gas, but others may be used including methane, synthetic gases or even hydrogen. Moreover, while the equipment and heat exchangers provided according to the invention are adapted to the heating of a variety of fluids, either liquid or gaseous, the invention is particularly well suited to the transfer of the available BTUs of the products of combustion to liquids and especially to the heating of water. For these reasons, the description given hereinafter refers to the utilization of the available BTUs in natural gas in the heating of water, but it is to be understood that these references are not to be construed in a limited sense.

One of the important objects of the present invention is the provision of a water heater employing a special combination of features including a combustion chamber and heat transfer tubes through which the combustion gases or products of combustion flow in a downward direction, while at the same time the conditions of heat transfer are established so as to reduce the temperature of the products of combustion to or below the dew point, provision further being made for downward delivery under the action of gravity of the condensate formed, thereby avoiding the necessity for the condensate and the flue gases to flow in the flue gas passages in opposite directions to each other. In accomplishing the foregoing, the present invention utilizes a blower effecting forced downward flow of the products of combustion from the combustion chamber through flue gas passages.

It is also contemplated according to the present invention to employ flue tubes for the flue gas and products of combustion, the flue tubes having their external surfaces in heat exchange relation to the water to be heated in a surrounding water flow space. In some instances the water flow space takes the form of annular passages surrounding the flue tubes, the passages being established by employment of water tubes surrounding the flue tubes, with appropriate tube sheets and water headers providing for circulation of the water in counterflow to the direction of flow of the gases through the inside flue tubes. This configuration is of particular importance in a heat exchanger as herein contemplated in which the temperature of the products of combustion is brought down below the dew point. The consequent development of the condensate results in development of certain acids having corrosive influence with respect to common types of metals employed in heat exchangers. In view of this, the invention contemplates employing highly acid resistant metals or surface treatment or coating of the metals to impart high acid resistance; and by confining the products of combustion to the interior of the inner tubes of the "tube-in-tube" heat exchangers disclosed, it is necessary to employ such special alloys or special surface treatments for the flue tubes only, instead of for both the inner and outer tubes, as would be needed in certain prior arrangements where the flue gases are passed through the tubular flow space between inner and outer tubes.

The invention also provides a novel form of gas and air admission means associated with the combustion chamber and providing increased efficiency in the intermixture of the gas and air being admitted into the combustion chamber.

It is another object of the invention to further enhance the efficiency of the heat transfer by employing a special form of helical fin within the flue tubes. Preferably these fins comprise individual twisted strips fitting into the interior of the flue tubes and providing for turbulence of the gas flow through the flue tubes. Preferably, such helical fins are metallurgically bonded to the interior surface of the flue tubes, and the fins not only provide the desired turbulence in the gas flow but also extensively increase the surface area within the flue tube providing for heat exchange from the products of combustion to the tube and thence through the tube wall to the surrounding water.

The invention also contemplates a system of automatic controls of novel form, as will be pointed out more fully hereinafter.

Still further the invention contemplates the employment of a novel form of gas discharge damper which is particularly adapted for use in combination with the downward flow of the flue gases as above described.

How the foregoing objects and advantages are attained, together with others which will be more fully developed hereinafter will be more fully apparent from the following description referring to the accompanying drawings illustrating four different embodiments of combustion and heat exchange devices according to the present invention.

BRIEF DESCRIPTION OF DRAWINGS

FIGS. 1 to 9 inclusive illustrate one embodiment of the invention and in this group of figures:

FIGS. 10 and 11 illustrate a second embodiment of a tube-in-tube type heat exchanger, and in which:

FIGS. 13 to 16 inclusive illustrate a fourth embodiment, and in this group of figures:

DETAILED DESCRIPTION OF THE DRAWINGS

In considering the specific embodiments herein disclosed, it is first pointed out that in all cases the arrangement and orientation of the equipment is such as to provide for downward flow of combustion products from a combustion chamber through flue tubes to a gas discharge duct; and in view of this, the common prior art reliance upon "natural draft" for the flow of products of combustion from a combustion chamber is not followed. In contrast, in all embodiments of the invention a blower or circulation fan is employed in order to establish downward gas flow and ultimate discharge of the products of combustion from the lower end of the discharge passages.

FIGS. 1 TO 9

In the embodiment of FIGS. 1 to 9 the assembly of the combustion chamber, flue tubes and water flow passages is arranged in the form of a vertically elongated unit with the combustion chamber located toward the upper end and with the gas discharge duct located toward the lower end.

Figures 1, 1A:
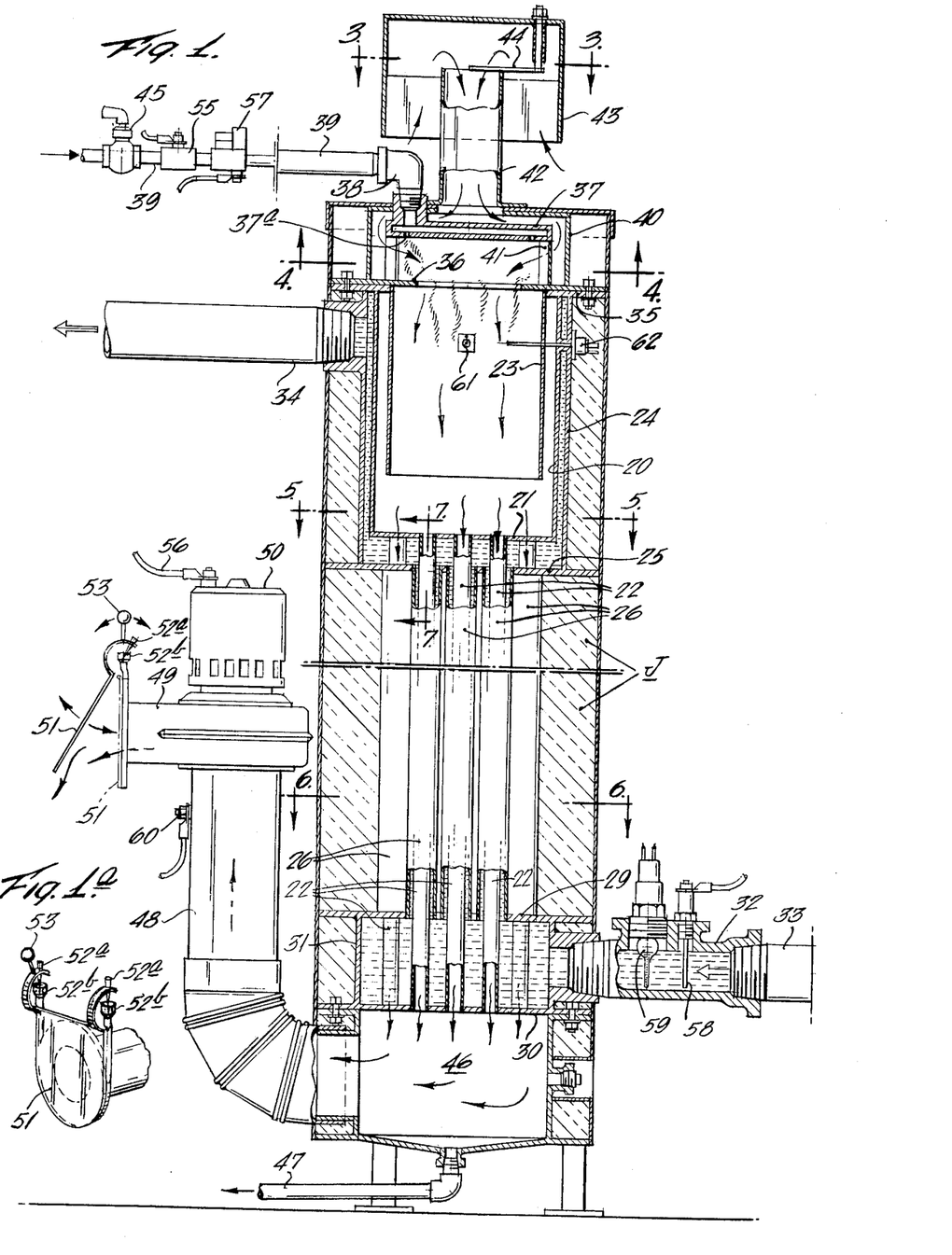
FIG. 1 is a vertical sectional view with certain parts in elevation, showing one embodiment of a tube-in-tube heat exchanger associated with a combustion chamber and providing for the heating of water, which in this case may be continuously flowing through the system.
FIG. 1a is a perspective fragmentary view of the damper arrangement employed for the discharge duct in FIG. 1.
Figures 2, 3, 4, 5, 6, 7, 8, 9:
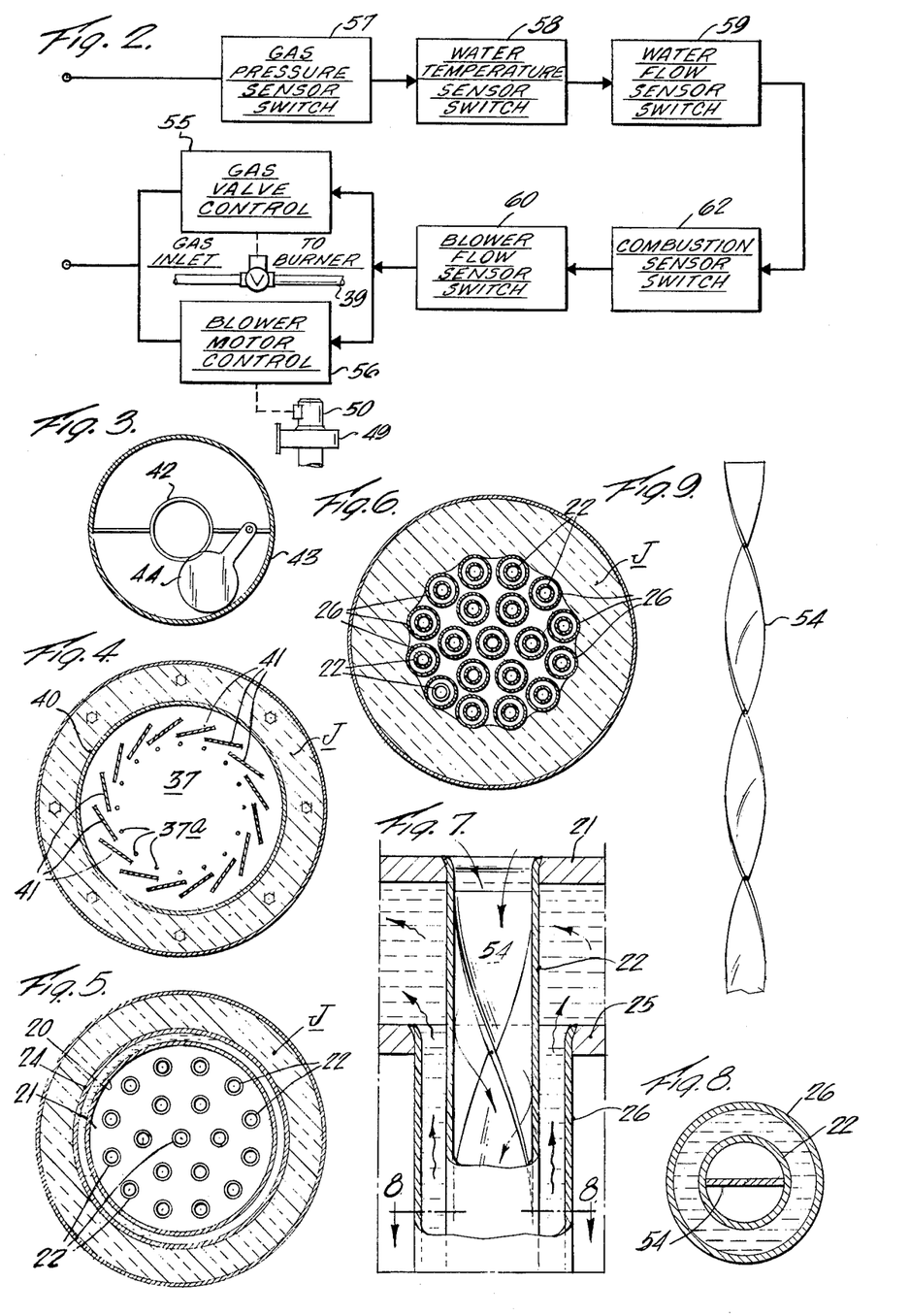
FIG. 2 is a block diagram of a system of controls preferably employed in association with a heat exchanger of the kind shown in FIG. 1.
FIGS. 3, 4, 5 and 6 are horizontal sectional views taken respectively as indicated by the section lines 3—3, 4—4, 5—5 and 6—6 on FIG. 1.
FIG. 7 is an enlarged fragmentary partial vertical section of one of the flue tubes and of the surrounding water tube, taken as indicated by the section line 7—7 on FIG. 1, and showing a portion of one of the helical fins employed.
FIG. 8 is a horizontal sectional view taken as indicated by the section line 8—8 on FIG. 7.
FIG. 9 is a fragmentary elevational view of a helical fin of the kind shown in FIGS. 7 and 8.

As best seen in FIG. 1, the arrangement comprises a combustion chamber having an outer generally cylindrical wall 20 joined at its lower end with the bottom wall 21 in the form of a tube sheet for a nest of flue tubes 22 (see also FIG. 5).

Within the cylindrical wall 20 a cylindrical liner or heat shield 23 is preferably provided, this liner having a smaller diameter than the wall 20 so as to provide a dead air space between the liner and the inside surface of the combustion wall 20. The liner is advantageously made of some special alloy steel having high heat resistance, preferably also possessing high resistance to oxidation, for instance, the alloy known as Incalloy 600, or so-called No. 321 or 345 stainless steel. The liner is also desirable in allowing at least most of the combustion chamber wall to maintain a high temperature and thereby provide a thermocatalytic action to hasten and complete the combustion process. Sufficient heat is radiated to the water wall to prevent excessive temperatures and possible damage to the heat shield 23. The water jacket wall 24 is closed at its lower end by the bottom wall 25 which also serves as a tube sheet for the water tubes 26, these water tubes having an inside diameter somewhat larger than the outside diameter of the flue tubes 22, so that each water tube and the enclosed flue tube define a cylindrical water flow space.

The bottom wall 21 of the combustion chamber and the bottom wall 25 of the water jacket are spaced from each other to define a portion of the water flow space in the heater which communicates not only with the annular channels between the flue and water tubes, but also with the cylindrical part of the water jacket lying between the combustion chamber wall 20 and the jacket wall 24.

Toward the lower end of the assembly, the water tubes 26 are associated with the tube sheet 29; and the lower ends of the flue tubes 22 are associated with a tube sheet 30, the two sheets 29 and 30 being spaced from each other and cooperating with the cylindrical wall 31 to define a water inlet header.

From the above it will be seen that the flow of the products of combustion extends downwardly from the combustion chamber and also that the water is delivered in counterflow to the gas flow from the lower portion of the unit upwardly to and through the water jacket surrounding the combustion chamber.

A water inlet connection 32 is associated with the cylindrical wall 31 of the header at the bottom of the assembly and this inlet connection is associated with the water supply connection 33.

Although a water heater or heat exchanger unit of the kind shown in FIG. 1 may be used for a number of purposes, this embodiment is particularly suited to continuous operation, for instance to the continuous warming of the water in a swimming pool or in some other reservoir, and in this event the supply line 33 would be extended from the recirculating pump commonly employed in swimming pool installations. The outlet from the water supply side of the system shown in FIG. 1 conveniently takes the form of an outlet connection 34 which, in the case of an installation for a swimming pool, may be extended to return the warmed water to the pool.

At the upper edge of the water jacket surrounding the combustion chamber wall 20 an annular wall 35 is positioned to close the upper edge of the water jacket and also to support the deck plate 36, which is centrally apertured. The space above the plate 36 accommodates the fuel and air inlet system which according to the present invention, takes a special form adapted to effect intimate intermixture of the fuel and air as they are being admitted into the upper end of the combustion chamber. A circular flat "pancake" fuel inlet manifold 37 is positioned above the level of the plate 36. Fuel is supplied to this manifold through the connection 38 associated with the gas supply line 39; and the lower wall of this manifold has an annular ring of gas inlet orifices 37a. A cylindrical wall 40 spaced around the manifold 37 provides an air inlet chamber surrounding the upper end of the combustion chamber, and a series of spaced vertical inclined fins 41 (see particularly FIG. 4) provide for introduction of the air from the chamber within the wall 40 into the upper end of the combustion chamber with a swirling motion. This introduction of air occurs in a direction transverse and immediately adjacent to the streams of gas directed downwardly from the annular series of gas inlet orifices 37a, thereby enhancing the intermixture of the air and gas immediately upon entry into the upper end of the combustion chamber. The annular wall 35 also preferably projects somewhat radially inwardly of the ring of orifices 37a, and this further assures the desired intimate intermixture of the fuel and air.

The air is introduced at the upper end of the assembly through the air duct 42 which is shielded by the downwardly open air inlet assembly 43 carrying an adjustable valve 44 (see particularly FIG. 3) by which the amount of air introduced may be controlled.

Supply and control devices are provided in the gas supply line 39, including the adjustable manual control valve 45, and by use of the control devices 44 and 45, the appropriate gas/air mixture may be introduced into the combustion chamber, the quantities preferably approximating the stoichiometric quantities for the particular gas being burned. The other control devices associated with the gas line will be described hereinafter.

At the lower end of the assembly a header or chamber 46 is provided into which the flue tubes 22 discharge the products of combustion including both the gases and also the condensate as above referred to. The condensate may be released through a condensate drain 47 at the bottom of the unit, and the gas discharge duct 48 also communicates with the header 46, extending laterally and thence upwardly for association with the blower indicated in outline at 49, adapted to be driven by the motor 50. The discharge connection from the blower 49 is provided with a discharge orifice presented toward the left as viewed in FIG. 1 and adapted to be controlled as by means of a damper 51. This damper is pivotally mounted by means of a pair of spaced pivot pins 52a each received in a conical socket 52b, as clearly seen in FIG. 1a. The damper also has a counter weight 53 associated therewith and positioned so that the counter weight will increase the closing force on the damper as the damper moves toward closed position. In this way in the event of failure of or termination of the operation of the blower motor 50, the damper will move to closed position and thus will prevent reverse flow of gas or air through the flue tubes and the combustion chamber under the influence of natural draft.

As seen in FIGS. 7, 8 and 9, each flue tube is preferably provided with an internal heat exchange fin in the form of a helically twisted strip 54 which serves not only to provide turbulence in the flue gas flowing through each flue tube, but which serves also to extensively increase the heat exchange area between the flue gas and the flue tube and thus through the wall of the flue tube to the surrrounding water. As above indicated, the fins may readily be formed by twisting a strip of metal. Moreover, it is contemplated to employ this twisting operation as a step in the method of assembling the fins and tubes. With a strip properly proportioned, (i.e. of proper width) the twisting action will flex the metal of the strip to sufficiently diminish the overall diametral dimension of the twisted fin, and in this way the insertion of the fin endwise into the tube may be facilitated. The twisting, however, should not be so great as to destroy the desired helical shape or width of the fin. The metal of the fins will of course have some resilience, and after twisting of the fin and the insertion into the tube, the twisting force on the fin may be released, thereby permitting the resilience of the metal to slightly "untwist" the fin, thereby automatically bringing the edges of the fin into contact with the inside wall of the tube.

The use of the inner tube of the tube-in-tube units for flow of the products of combustion and the use of the fins inside of the inner tubes has still another advantage. This may be explained as follows:

If the annular space between the tubes were to be used for flow of the products of combustion and if fin elements were introduced into the annular space, efficient heat transfer through the metal of the fins would require that the fins be bonded to both the inside surface of the outer tube and to the outside surface of the inner tube, thus doubling the bonding problem. Moreover, such an arrangement would preclude separation of the tubes except by destroying the bond. These disadvantages are eliminated by the arrangement of the invention.

In the preferred embodiment the helical fin has its edges metallurgically bonded to the inside tube wall. The bonding of the helical fin within the inside of the tube may be effected in any of a number of ways, depending in part upon the metals employed for the flue tubes and also for the fins. As will be explained more fully hereinafter any of a variety of metals may be used, depending upon the intended conditions of use of the equipment. As will be further explained, various features of the invention may be employed even where the conditions of use do not tend to produce appreciable corrosion. Tubes and fins may be made of copper and when employing copper the fins may be readily bonded to the inside of the tubes by means of lead, tin, or silver solder. A bonding operation may be effected by application of the solder or bonding material to the edges of the fins and/or to the inside surface of the flue tubes, and after assembling, the assembly may be heated in order to fuse the solder and effect the bonding.

In accordance with another technique which may be employed, after insertion of the fins into the tubes, the assembly may be subjected to an electroplating operation, and in this event the electroplated metal may be highly corrosion resistant, so that the electroplating operation serves not only to bond the fin to the tube but serves also to impart corrosion resistance both to the fin and to the tube. By way of example tubes and fins may be formed of copper and may then be electroplated with nickel and/or chromium. Low temperature surface areas (below the dew point) may be protected by spray coating with certain of the silicone rubber materials as produced by General Electric Co., by one of the family of polyurethanes or by a highly inert adhesive material known as Solarcoat, developed for use in Aerospace activities, for instance to protect certain missile components. For better thermal conductivity these materials may be aluminum "Filled". These materials provide excellent protection against corrosion of the metal surface to which it is bonded. The coating thickness is preferably limited to approximately two mils.

As an example of such coating materials, reference is made to Polythane-(CP-500). CP-500 is a polyester, epoxyized, urethane, nylon-linked coating that exhibits extremely good resistance to acids, hydro-carbons, chemicals, infrared rays, salt water and virtually any other substance normally associated with corrosive environments.

In a system of the kind disclosed in FIGS. 1 to 9 inclusive, it is contemplated to employ a number of controls of automatic character, particularly for the purpose of safety and protection of the equipment. Although some of the controls described just below may be used in types of equipment which are not necessarily operated continuously, the embodiment shown in FIGS. 1 to 9 is capable of continuous operation. The controls as illustrated for this embodiment (see particularly FIGS. 1 and 2) include a gas supply shut-off valve 55. In addition the fan motor 50 is provided with a controlled power supply connection 56, and it is contemplated that both the control 55 and the connection 56 be operated (to shut off the gas supply and turn off the blower) in the event of anyone of five contingencies, control devices or sensors for these purposes being shown at certain points in FIG. 1 and in the block diagram of FIG. 2. First note than in FIG. 2, the gas shut-off valve 55 is diagrammatically indicated, as is also the motor shut-off connection 56. In the schematic block diagram of FIG. 2 these two devices 55 and 56 are shown as being connected in parallel with each other but in series with five other devices, anyone of which will open the circuit and thus terminate operation of the blower motor and shut off the supply of gas.

Individually the various devices for terminating the operation of the heat exchanger, all of which are shown in both FIGS. 1 and 2, include a gas pressure sensor switch 57 operating in the event the gas pressure abnormally decreases or is terminated, thereby shutting off the gas supply line and the blower motor.

A water temperature sensor switch 58 is provided and is positioned in the water inlet connection 32, being arranged to shut off the gas supply and the motor in the event the water in the swimming pool (or other reservoir) does not require heating.

A water flow sensor switch 59 operates to shut off the gas supply and the motor in the event that the input of water to the system is terminated.

A blower flow sensor switch 60 is provided in the discharge duct 48 and this device also will shut off both the gas supply valve and the motor in the event of a blower malfunction resulting in a failure of exhaust gas to flow through the system.

Within the combustion chamber a gas ignitor 61, preferably of spark type is provided, and in the close vicinity of the ignitor a combustion sensor switch 62 is provided, this switch functioning in known manner to open the control circuit after an interval of a few seconds, (usually from about 2 to 8 seconds) after operation of the ignitor, in the event that combustion has not been established.

This control system is particularly desirable in the type of arrangement disclosed wherein the gas flow is downward from the combustion chamber through the flue tubes, it being noted that the blower is relied upon for the desired direction of gas circulation which would not occur and would indeed be reversed in the event of failure of the motor or blockage of the flow path either at the inlet end or the outlet end, or even in the flue tubes.

Although the equipment may be used in a number of ways, it is contemplated that for many purposes, the conditions of operation, including the flow rate of the water through the system and also the flow rate of the gases through the system, as well as various temperature factors be established in ranges providing for cooling of the flue gases below the dew point prior to discharge from the flue tubes. This results in conversion of the water vapor to liquid form and in the utilization of the significant amount of latent heat of condensation. It is important in the system just described that the gas flows downwardly in the flue tubes, because of the development of the condensate in the flue tubes. Such condensate will flow downwardly by gravity on the inside surfaces of the flue tubes and may thus be conveniently discharged at the bottom, which is in distinct contrast to various prior arrangements including my prior U.S. Pat. No. 3,669,079 in which the gas flow is directed upwardly from a combustion chamber located below the flue tubes and in which, therefore, condensate discharging downwardly by gravity from the flue tubes would enter the combustion chamber.

The use of the inside tube of the tube-in-tube units as the flue tube, and the use of the annular space between the inner and outer tubes of the tube-in-tube units for water flow also has great advantages because of the tendency for the condensate to develop corrosive acids. With the configuration just referred to, it is only the inside flue tube which is subject to the corrosive influence. Therefore, if it is desired to extend the life of the equipment, the flue tube is preferably formed of a highly acid resistant metal or is provided with a coating in some manner to protect the surface on which the condensate is formed, for instance as elsewhere described herein.

It will be seen therefore that there are highly advantageous interrelationships between various features of the arrangement herein disclosed, including the upper location of the combustion chamber, the downward flow of the gases and including the provision for flow of the gases through the inside tube of the tube-in-tube assemblies; and this is especially true in the system as contemplated in which the temperature of the gas is reduced to a value below the dew point.

Because of the high and still increasing cost of fuels, the increased efficiency (waste decrease) resulting from low stack or flue gas temperature is an important advantage of the system disclosed.

The equipment may be used however, under operating conditions in which the combustion gases are not cooled to a temperature below the dew point. Many features of the invention improve efficiency of operation even without cooling of the gases below the dew-point.

In addition to the metals referred to hereinabove in connection with the helical fins, it is contemplated that the flue tubes and the helical fins 54 may be fabricated from various metals, such as copper, Admiralty brass metal, stainless steel, monel metal or aluminized steel. An example of an appropriate metal for this purpoe is Admiralty brass of type B, as follows:

| Copper | 70. to 73.% |
|---|---|
| Tin | .9 to 1.2% |
| Lead | 0.07% max |
| Iron | 0.06% max |
| Zinc | Remainder |
| Arsenic | 0.02 to 0.10% |

Another highly corrosion resistant metal is Carpenter alloy steel-20cb-3, as follows:

| Carbon | 0.06% max |
|---|---|
| Manganese | 2.% max |
| Phosphorous | 0.035% max |
| Sulfur | 0.035% max |
| Silicon | 1.% max |
| Chromium | 19./21% |
| Nickel | 32.5/35. % |
| Molybdenum | 2./3. % |
| Copper | 3./4. % |
| Columbium + Tantalum | 8 × C min/1.% man |
| Iron | Balance |

As an alternative, a high degree of corrosion resistance can be developed by employing a thin coating of silicone resin materials on the metal. For instance, some types of rubber-silicone can be employed for this purpose, or certain copper protecting coatings can be applied to other metals. Coatings of this kind are not porous and are virtually completely inert to all acids; and in thin layers they do not result in any significant impairment of heat transfer. In the use of aluminized steel, the surfaces of the steel are heated in a bath of pure molten aluminum containing approximately 6% silicon. This can be effectively done in a nitrogen atmosphere containing about 5-15% hydrogen. Still other effective coating techniques are also described hereinabove.

Preferably the assembly of the tube bundle and the combustion chamber as well as the water header is enclosed in some insulation jacket, such jacket being indicated by the letter J.

Figures 10, 11:
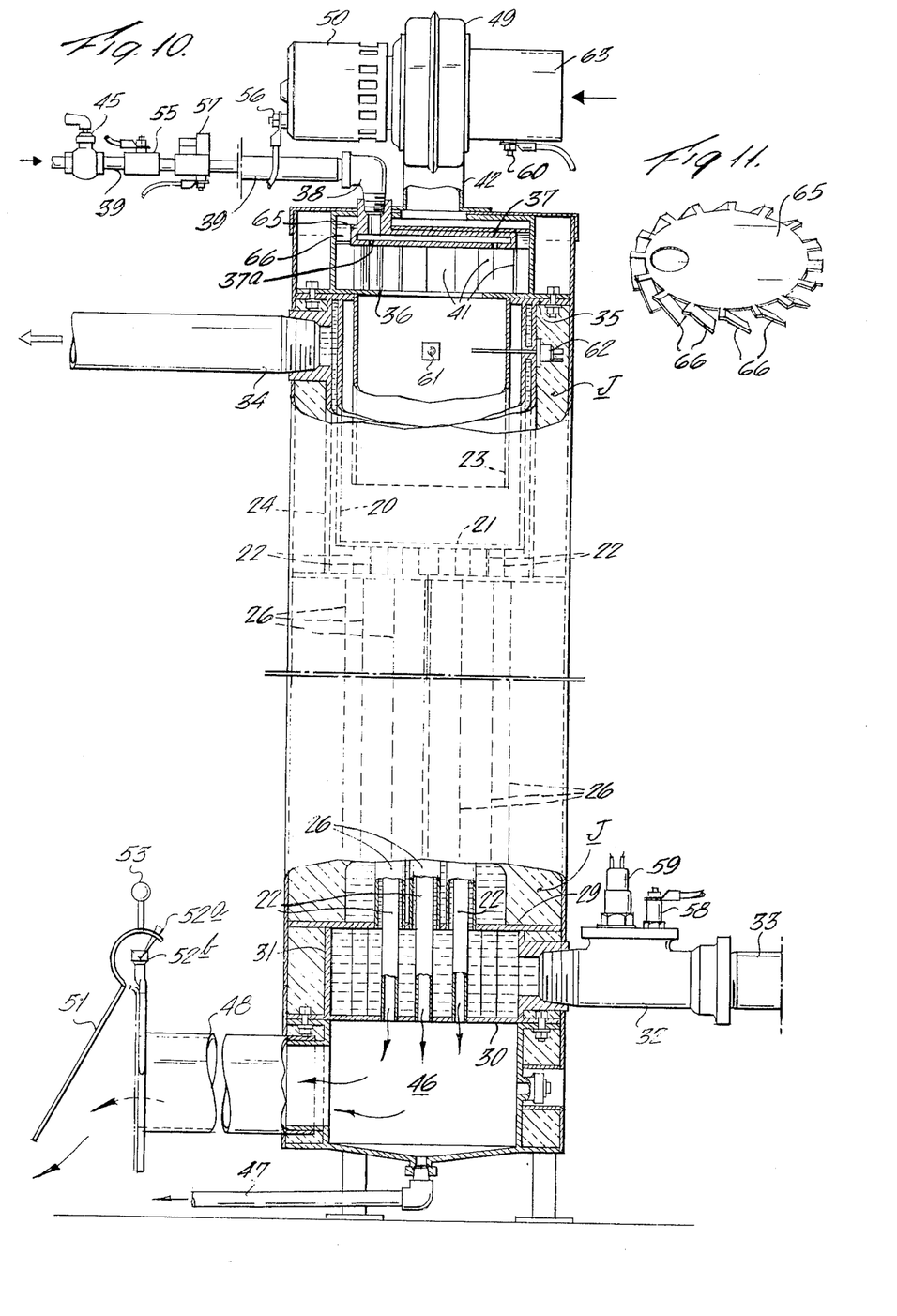
FIG. 10 is an elevational view with certain portions only at the top and bottom shown in vertical section.
FIG. 11 is a perspective view of a device incorporated in the gas and air inlet region of the arrangement of FIG. 10 for enhancing intermixture of the gas and air.

FIGS. 10 AND 11

The embodiment shown in FIGS. 10 and 11 closely resembles that of FIGS. 1 to 9 inclusive. The chief differences here are the location of the blower fan at the input side of the system instead of on the output side as in FIG. 1. Thus, the blower 49 is associated with the air inlet 42 and the blower flow sensor switch 60 is associated with the air inlet 63. The discharge duct 48, is provided with an outlet opening with which the damper 51 is associated. In the embodiment of FIGS. 10 and 11, the air inlet 42 delivers the air to the upper side of an air diffuser 65 having inclined vanes 66 to assist in preventing blower turbulence in the incoming air.

In other respects the general arrangement of the heat exchanger in FIG. 10 is the same as in FIG. 1; and the control system shown in FIG. 2 may be used with the arrangement of FIG. 10.

Figure 12:
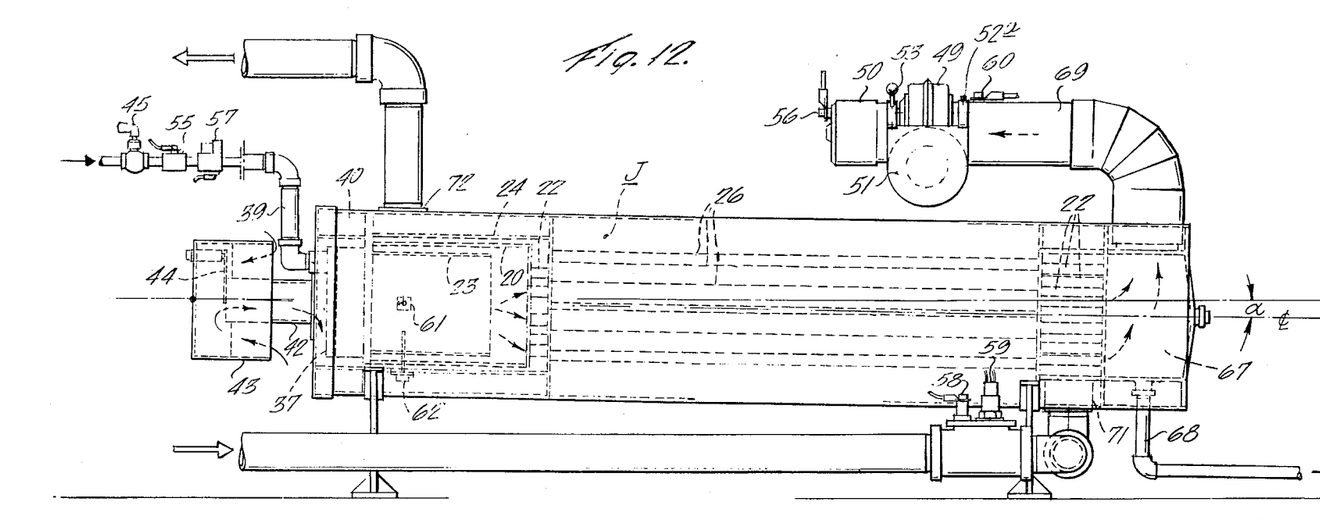
FIG. 12 shows a third embodiment chiefly in elevation, this embodiment being similar to those shown in FIGS. 1 and 10, but with the heat exchanger positioned generally horizontally instead of vertically.

FIG. 12

The heat exchanger unit as shown in FIG. 12 is essentially the same as shown in FIG. 1, but in this embodiment instead of being positioned in a substantially vertical position, the unit is shown as being mounted generally horizontally, but with a downward incline of the flue tubes from the combustion chamber to the gas discharge chamber 67. This chamber takes a slightly different form than that of the discharge chamber in FIGS. 1 and 10, having a condensate drain connection 68 positioned as shown and further having an upwardly and then laterally extended gas discharge duct 69 with which the blower 49 is associated. The blower 49 may have a discharge orifice presented laterally as indicated. The air inlet may be of the same type as shown at 42.

The water input connection is desirably arranged as indicated at 71 and the water output connection is shown at 72.

Because of the slight incline of the flue tubes, the condensate in this embodiment may readily be delivered into the chamber 67 and then withdrawn through the condensate drain 68.

A control system of the kind shown in FIG. 2 may be used with the arrangement of FIG. 12.

FIGS. 13 TO 16

Figures 13, 14, 15:
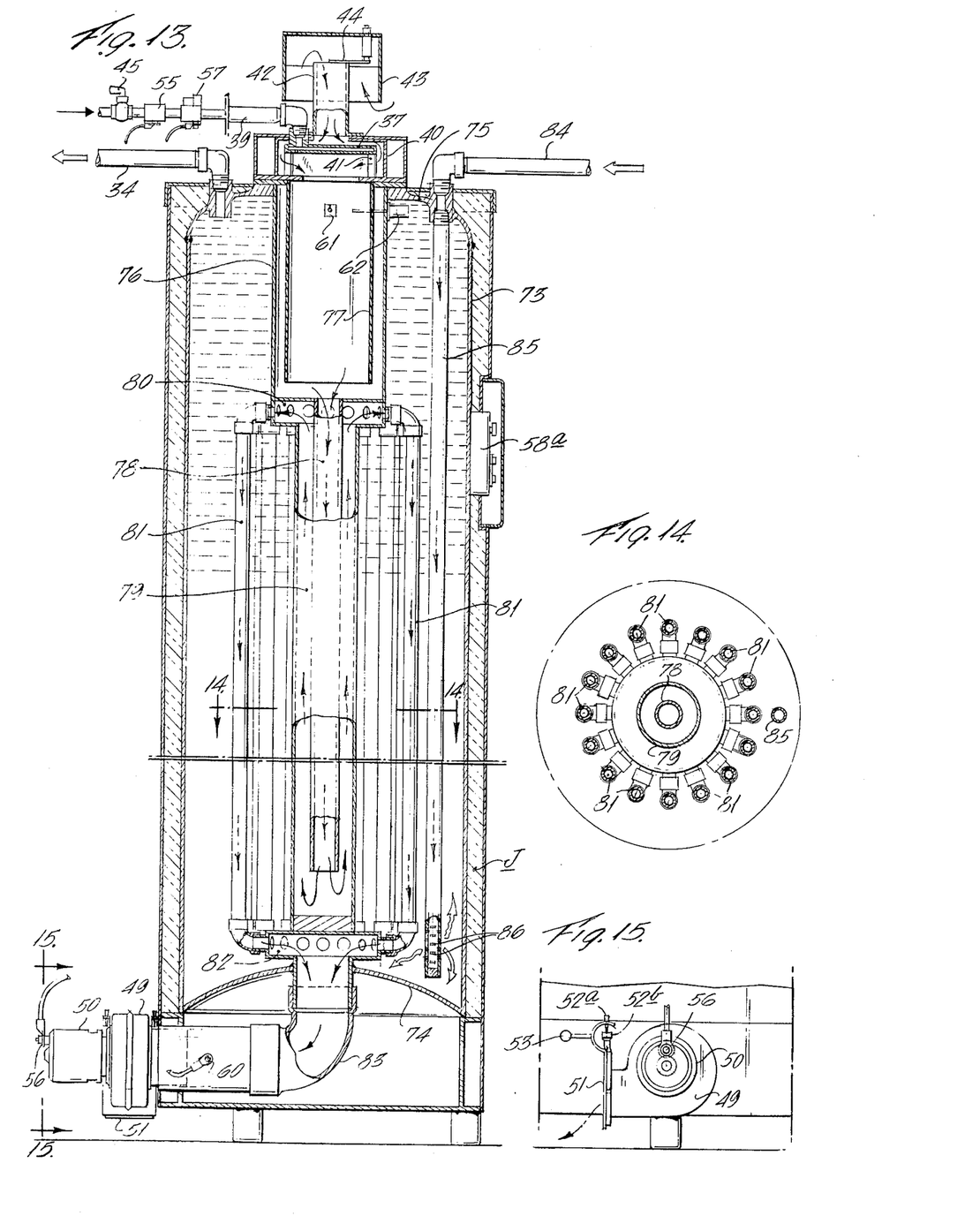
FIG. 13 is a vertical sectional view with portions in elevation showing a water heater having a storage tank for retention of a supply of heated water.
FIG. 14 is a horizontal sectional view taken as indicated by the section line 14—14 on FIG. 13.
FIG. 15 is a fragmentary elevational view of the blower and associated parts taken as indicated by the section line 15—15 on FIG. 13.

The form of heat exchanger shown in FIGS. 13 to 15 comprises a tank type of water heater adapted for intermittent operation and adapted to establish a hot water supply, for example for use as a domestic water heater. This unit comprises a tank or shell 73 closed by the bottom wall 74 and the top wall 75. A combustion chamber wall 76 is provided in the upper end of the water tank and a spaced liner 77 is arranged within the wall 76 in order to provide the dead "air" space above referred to. Gas is introduced into the combustion chamber by a supply connection 39 arranged in the same general manner as described above with respect to FIG. 1, and in addition the air supply at the top may also conform with that described in connection with FIG. 1.

A tube bundle is positioned in the tank below the combustion chamber and this tube bundle comprises a number of components, as described just below.

First, a central primary flue tube 78 is connected with the bottom of the combustion chamber and extends downwardly throughout most of the height of the heater, delivering at its lower end into an annular space formed between this primary flue tube and a surrounding flue duct 79. The products of combustion then flow upwardly through the annular space referred to and into the header 80 which is positioned just below the combustion chamber and with which the upper ends of the nest of flue tubes 81 are connected. The flue tubes 81 are in turn connected with the lower header 82 with which the discharge duct 83 is associated. The duct 83 leads to the blower 49 which is driven by the motor 50. The water input originates in the supply line 84 and the water is delivered downwardly through the pipe 85 located within the tank to be discharged into the tank space through a series of slots 86 provided in the lower end portion of the pipe 85. The slots serve to prevent turbulence and allow stratification of the cold input water in the lower portion of the tank. This serves to maintain at all times maximum temperature differential between the cold input and the combustion products just before their discharge. This principle is conducive to very low stack gas temperature which may be in the range of 70°-75° F. in contrast to the 600°-700° F. as is the case with present tank type water heaters.

It will be noted that in this embodiment the flue duct 79 as well as the flue tubes 81 are all immersed in the water in the tank and further that the positioning of the combustion chamber within the top of the tank serves, in effect, to contribute water jacketing of the combustion chamber.

Here again it is contemplated that for at least some purposes the conditions of temperature, and rates of flow of water be established within ranges providing for decrease in temperature of the flue gases to a value below the dew point during the downward flow of the gas through the flue tubes 81. This action will serve to utilize the latent heat of condensation and provide for downward delivery of the condensate along with the gases. In this embodiment it is contemplated that the condensate may be discharged directly along with the discharging gases through the blower and from the discharge orifice which is controlled by the damper 51 shown in FIG. 15. To prevent corrosion of the metals in the blower area, they are preferably made of corrosion resistant alloys, or appropriately coated materials as previously described.

It is contemplated that the flue tubes 81 of the embodiment of FIGS. 13 to 16 be equipped with helical fins of the type fully described hereinabove.

The delivery of the water into the tank through the slots 86 provides for entrance of the water into the lower portion of the tank in relatively quiescent condition, and this is of importance in this tank type of installation in order to avoid extensive intermixing of the cooler water entering into the bottom of the tank with the hotter water nearer to the top of the tank. The maintenance of a quiescent and cool zone in the water at the bottom of the tank aids in establishing a temperature condition toward the lower ends of the flue tubes 81 conducive to reduction of gas temperature to a value below the dew point.

Figure 16:
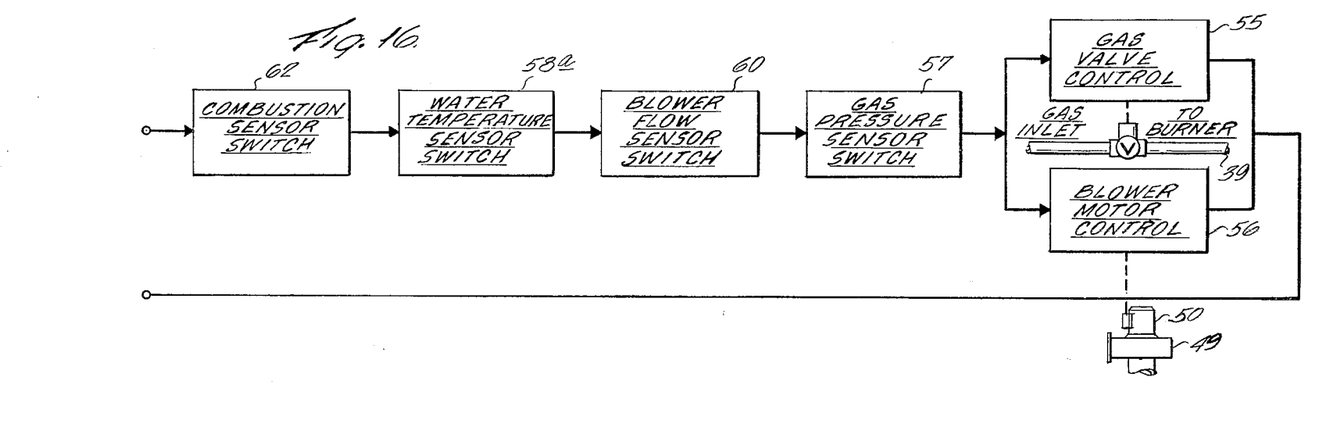
FIG. 16 is a block diagram of a system of controls preferably employed in association with a heat exchanger of the kind shown in FIG. 13.

A control system preferably employed in connection with the tank type of heater shown in FIG. 13 is indicated in FIG. 16. Here it will be seen that the control components are the same as or similar to those described above in connection with FIG. 2, with one exception, namely the system of FIG. 16 does not include a water flow sensor switch, because in the tank type of installation it is normal for the flow to be intermittent. Also, the water temperature sensor switch indicated at 58a in FIGS. 13 and 16 is arranged to sense the temperature of the water within the tank, (for instance, through the tank wall), rather than in the water supply connection as in the other embodiments.

CONCLUSION

In connection with the operation of heat exchangers of the kind herein disclosed, several important factors are pointed out, as follows.

First, the combustion of a typical natural gas develops a substantial quantity of water vapor. Where the combustion gases are cooled to a temperature below the dew point, one pound of a typical natural gas produces approximately 2.25 lbs of water condensate; and this large amount represents a very high quantity of available BTU's which, with most equipment, is completely wasted, because the gases or products of combustion are discharged to atmosphere at temperatures above the dew point. In a typical case the BTU value recovered by virtue of condensation of the water vapor in the products of combustion may be as high as 970 BTU's per pound of condensate, or 2180 BTU's per pound of natural gas.

Actual test runs of equipment constructed in accordance with the present invention have established that the equipment may operate at as high as 90 to over 95% of maximum possible thermal efficiency, in relation to the BTU value of the natural gas burned.

Still another advantageous feature of applicants equipment when operated in a manner to reduce the temperature of the products of combustion below the dew point before discharge of the gas to the atmosphere, is that these gases at such low temperatures are virtually non-toxic, and may therefore be released to the atmosphere in any environment without objectionable pollution. Still further, since the gases are released at a low temperature, typically well below the dew point and even down to temperatures approximating ambient, for instance 70° to 75° F., fire hazard is eliminated, even where the gases are delivered to the atmosphere through the wall of a house or other building.

In connection with the references herein to the dew point, it is to be kept in mind that the dew point will vary with different fuel gases. Some natural gases, containing little if any sulfur compounds, have a dew point equivalent to that of substantially uncontaminated water, i.e., usually well below the boiling point, even down to about 120°-140° F. On the other hand, with gases containing substantial amounts of contaminants, particularly sulfur compounds, the dew point is substantially higher, usually well above the boiling point of water, for instance in the neighborhood of 250°-300° F. In either event, i.e., with either type of gaseous fuel, it is contemplated for maximum recovery of BTU's to effect heat transfer sufficiently to bring the temperature of the combustion products down to a temperature below the dew point.

Although it is preferred for most purposes to use helical fins in various of the flue tubes described, it is to be understood that for some purposes, other forms of devices may be employed to promote turbulence in the flow of the products of combustion and also to increase the heat transfer area. Many features of the invention are also advantageously used in equipment in which no fins or other similar devices are employed.

I claim:

1. A water heater comprising a combustion chamber, a plurality of flue tubes each with its inlet end connected with the combustion chamber toward one side thereof, and each having an outlet end for discharge of combustion gases, the inlet end of each flue tube being at least as high as the outlet end, means for introducing fuel and air into the combustion chamber in a region remote from the connection of the flue tubes, a water tube surrounding each flue tube with a water inlet end adjacent the outlet end of the flue tube and with a water outlet end adjacent the connection of the inlet end of the flue tube with the combustion chamber, a header for receiving flue gases and condensate from the discharge ends of the flue tubes and having a condensate drain at a level below the discharge ends of the flue tubes, and a discharge duct for the products of combustion connected with said header.

2. A water heater as defined in claim 1 in which each flue tube is arranged in a generally upright position with its outlet end presented downwardly and with said header positioned below the outlet ends of the flue tubes.

3. A water heater as defined in claim 1 in which each flue tube is arranged in a generally horizontal position and with said header positioned laterally beyond the outlet ends of the flue tubes.

4. A water heater comprising a combustion chamber, a plurality of heat exchange flue tubes each with its inlet end connected with the combustion chamber toward one side thereof, and each being extended from said one side in a direction away and progressively downwardly from the combustion chamber and having an outlet end for discharge of combustion gases, means for introducing fuel and air into the combustion chamber in a region remote from the connection of the flue tubes, means defining water flow space surrounding each flue tube with a water inlet adjacent the outlet end of the flue tube and with a water outlet adjacent the connection of the inlet end of the flue tube with the combustion chamber, a header for receiving flue gases and condensate from the discharge ends of the flue tubes and having a condensate drain at a level below the discharge ends of the flue tubes, a discharge duct for the products of combustion connected with said header, and a blower operating during heat exchange to circulate air into the combustion chamber and the products of combustion downwardly through the flue tubes.

5. A water heater as defined in claim 4 in which the blower is positioned in said discharge duct.

6. A water heater as defined in claim 4 in which the blower is positioned in the air inlet means.

7. A water heater as defined in claim 4 and further including a discharge damper associated with said discharge duct and having means automatically operative to close upon cessation of blower operation.

8. A water heater comprising a combustion chamber, a bundle of pairs of inside and outside tubes extended in generally upright position below the combustion chamber and providing sets of central and surrounding annular flow passages in indirect heat exchange relation to each other, one set of said flow passages having their inlet ends connected with the combustion chamber and having outlet ends for discharge of combustion gases, means for introducing fuel and air into the combustion chamber and for delivering products of combustion downwardly through said one set of flow passages, means for flowing water to be heated upwardly through the other set of said flow passages, a header receiving products of combustion and condensate from the lower ends of said one set of flow passages and having a condensate drain at a level below the lower ends of said one set of flow passages, and a discharge duct for the products of combustion connected with said header.

9. A water heater as defined in claim 8 in which the temperatures and flow rates of the combustion products and water and the heat exchange area between said two sets of flow passages provide for reduction of the temperature of the combustion products below the dew point.

10. A water heater as defined in claim 9 in which water is flowed through the set of annular flow passages and in which the products of combustion are flowed downwardly through the set of central passages thereby providing for downward discharge of condensate into said header.

11. A water heater comprising a combustion chamber, a flue tube with its inlet end connected with the combustion chamber toward one side thereof, and having and outlet end for discharge of combustion gases, the inlet end of the flue tube being at least as high as the outlet end, means for introducing fuel and air into the combustion chamber in a region remote from the connection of the flue tube, a shut-off valve for the fuel, a water flow system including means defining water flow space surrounding the flue tube with a water inlet adjacent the outlet end of the flue tube and with a water outlet adjacent the connection of the inlet end of the flue tube with the combustion chamber, a header for receiving flue gases and condensate from the discharge end of the flue tube and having a condensate drain at a level below the discharge end of the flue tube, a discharge duct for the products of combustion connected with said header, a blower for effecting forced flow of the products of combustion through the flue tube, and means responsive to cessation of water flow through the water flow system to close the fuel shut-off valve and to disable the blower.

12. A water heater as defined in claim 11 and further including means responsive to cessation of combustion gas flow to close the fuel shut-off valve and to disable the blower.

13. A water heater as defined in claim 11 and further including a water temperature-responsive thermostat and means responsive to rise in water temperature above a predetermined value to close the fuel shut-off valve and to disable the blower.

14. A water heater as defined in claim 11 and further including a fuel supply line connected with the combustion chamber, and means responsive to drop in pressure in said supply line to close the fuel shut-off valve and disable the blower.

15. A water heater comprising a combustion chamber, a flue tube with its inlet end connected with the combustion chamber toward one side thereof, and having an outlet end for discharge of combustion gases, the inlet end of the flue tube being at least as high as the outlet end, means for introducing fuel and air into the combustion chamber in a region remote from the connection of the flue tube, a shut-off valve for the fuel, a water flow system including means defining water flow space surrounding the flue tube with a water inlet end adjacent the outlet end of the flue tube and with a water outlet end adjacent the connection of the inlet end of the flue tube with the combustion chamber, a header for receiving flue gases and condensate from the discharge end of the flue tube and having a condensate drain at a level below the discharge end of the flue tube, a discharge duct for the products of combustion connected with said header, and means responsive to cessation of water flow through the water flow system to close the fuel shut-off valve.

16. A water heater as defined in claim 15 and further including means responsive to cessation of combustion gas flow to close the fuel shut-off valve.

17. A water heater as defined in claim 15 and further including a water temperature-responsive thermostat and means responsive to rise in water temperature above a predetermined value to close the fuel shut-off valve.

18. A water heater as defined in claim 15 and further including a fuel supply line connected with the combustion chamber, and means responsive to drop in pressure in said supply line to close the fuel shut-off valve.

19. A water heater as defined in claim 15 and further including a blower for effecting forced circulation of the products of combustion, and means responsive to cessation of circulation of the products of combustion to close the fuel shut-off valve.

20. A water heater as defined in claim 19 in which the blower is positioned in the discharge duct for the products of combustion.

21. A water heater as defined in claim 19 in which the blower is positioned in the means for introducing air into the combustion chamber.

22. A water heater comprising a bundle of pairs of inside and outside tubes extended in position with one end higher than the other end and providing sets of central and surrounding annular flow passages in indirect heat exchange relation to each other, a combustion chamber positioned adjacent to the higher end of the tube bundle, one set of said flow passages having their inlet ends connected with the combustion chamber and having outlet ends for discharge of combustion gases, means for introducing fuel and air into the combustion chamber and for delivering products of combustion downwardly through said one set of flow passages, means for flowing water to be heated upwardly through the other set of said flow passages, a header for receiving products of combustion from the lower ends of said one set of flow passages, a discharge duct for products of combustion connected with said header and having a discharge opening, a blower for effecting forced downward flow of the products of combustion through said one set of flow passages and discharge thereof through said opening, and a damper for closing said opening, said damper being mounted and arranged to open when the blower is operating to effect forced downward flow and discharge and to close in the absence of said forced downward flow and discharge.

23. A water heater comprising a combustion chamber having inner and outer spaced walls, a water jacket surrounding the outer wall of the combustion chamber, a group of generally upright flue tubes for combustion gases having communication with a lower portion of the combustion chamber, means defining water flow space surrounding the flue tubes and communicating at its upper end with a lower portion of said water jacket, a water inlet connection communicating with said water flow space toward the bottom thereof, a water outlet connection communicating with said water jacket toward the top thereof, means for introducing fuel and air into said combustion chamber, a discharge duct for the products of combustion communicating with the lower ends of said flue tubes, and a blower for effecting downward flow of the products of combustion from the combustion chamber through the flue tubes and delivery of said products through the discharge duct.

24. A water heater as defined in claim 23 in which said means defining said water flow space comprises individual water tubes respectively surrounding the individual flue tubes.

25. A water heater as defined in claim 23 in which said means defining said water flow space comprises a tank type structure enclosing a plurality of the flue tubes.

26. A water heater as defined in claim 25 in which the communication between the flue tubes and the combustion chamber comprises a common header with which the upper ends of the flue tubes are connected, a primary flue tube connected with and extended downwardly from the combustion chamber, and a flue duct surrounding said primary flue tube with its lower end communicating with the lower end of the primary flue tube and with its upper end communicating with said header, the flue duct having its outlet surface exposed to the water in said water flow space.

27. A water heater comprising an assembly of generally upright tubular heat exchange elements exposed on the inside to products of combustion and on the outside to water to be heated, a combustion chamber at the upper end of said elements and delivering combustion products into said tubular elements, a discharge duct for the combustion products connected with the lower end of said elements and having a discharge opening, a blower for effecting downward flow of combustion products through said elements and duct for discharge through said discharge opening and a damper for said opening, the damper being mounted for pivotal movement under the action of gravity from open to closed position, and being responsive to discharge of combustion products under the influence of said blower to move to open the opening of said duct.

28. A water heater as defined in claim 27 in which the damper is suspended from a generally horizontal pivot axis provided by spaced pairs of pins engaged in sockets, and further having a counterweight connected with the damper and projecting from the pivot axis in a direction providing different damper closing force as between open and closed positions, with the greater damper closing force imposed when the damper is closed.

29. A method for heating a fluid by means of a generally upright heat exchange tube having an inlet at the top and an outlet at the bottom, comprising effecting upward flow of said fluid from the lower end to the upper end of said tube and in contact with the outside surface of said tube, effecting forced flow of hot products of combustion of gaseous fuel and air in a downward direction within said tube from said inlet to said outlet, and establishing conditions of temperature and rates of upward flow of said fluid and downward flow of said products of combustion providing for cooling of the products of combustion to a temperature below the dew point before discharge of the products of combustion from said tube.

30. A water heater comprising a combustion chamber, a group of generally upright flue tubes for combustion gases having communication with a lower portion of the combustion chamber, a tank structure enclosing a plurality of the flue tubes and defining a water flow space surrounding the flue tubes and the combustion chamber, a water inlet connection communicating with said water flow space toward the bottom thereof, a water outlet connection communicating with said water flow space toward the top thereof, means for introducing fuel and air into the combustion chamber, a discharge duct for the products of combustion communicating with the lower ends of the flue tubes, a blower for effecting downward flow of the products of combustion from the combustion chamber through the flue tubes and delivery of said products through the discharge duct, and control mechanism for the heater comprising a fuel shut-off control, a blower shut-off control, and means responsive to rise in water temperature in said tank above a predetermined value to shut off both the fuel and the blower.

31. A water heater comprising a combustion chamber, a group of generally upright flue tubes for combustion gases having communication with a lower portion of the combustion chamber, a tank structure enclosing a plurality of the flue tubes and defining a water flow space surrounding the flue tubes and the combustion chamber, a water inlet connection communicating with said water flow space toward the bottom thereof, a water outlet connection communicating with said water flow space toward the top thereof, means for introducing fuel and air into the combustion chamber, a discharge duct for the products of combustion communicating with the lower ends of the flue tubes, a blower for effecting downward flow of the products of combustion from the combustion chamber through the flue tubes and delivery of said products through the discharge duct, and control mechanism for the heater comprising a fuel shut-off control, a blower shut-off control, and means responsive to failure of fuel supply to shut off both the fuel shut-off control and the blower shut-off control.

32. A water heater comprising a combustion chamber, a group of generally upright flue tubes for combustion gases having communication with a lower portion of the combustion chamber, a tank structure enclosing a plurality of the flue tubes and defining a water flow space surrounding the flue tubes and the combustion chamber, a water inlet connection communicating with said water flow space toward the bottom thereof, a water outlet connection communicating with said water flow space toward the top thereof, means for introducing fuel and air into the combustion chamber, a discharge duct for the products of combustion communicating with the lower ends of the flue tubes, a blower for effecting downward flow of the products of combustion from the combustion chamber through the flue tubes and delivery of said products through the discharge duct, and control mechanism for the heater comprising a fuel shut-off control, a blower shut-off control, fuel ignition means, and means responsive to ignition failure to shut off both the fuel shut-off control and the blower shut-off control.

33. A water heater comprising a combustion chamber, a group of generally upright flue tubes for combustion gases having communication with a lower portion of the combustion chamber, a tank structure enclosing a plurality of the flue tubes and defining a water flow space surrounding the flue tubes and the combustion chamber, a water inlet connection communicating with said water flow space toward the bottom thereof, a water outlet connection communicating with said water flow space toward the top thereof, means for introducing fuel and air into the combustion chamber, a discharge duct for the products of combustion communicating with the lower ends of the flue tubes, a blower for effecting downward flow of the products of combustion from the combustion chamber through the flue tubes and delivery of said products through the discharge duct, and control mechanism for the heater comprisng a fuel shut-off control, a blower shut-off control, and means responsive to failure of the downward flow of the combustion products to shut off both the fuel shut-off control and the blower shut-off control.

34. A water heater comprising an assembly of tubular heat exchange elements with one end higher than the other and exposed on the inside to products of combustion and on the outside to water to be heated, means for delivering hot products of combustion of fuel and air into the upper ends of said tubular elements, a discharge duct for the combustion products connected with the lower ends of said elements and having a discharge opening, a blower for effecting downward flow of combustion products through said elements and duct for discharge through said discharge opening and a damper for said opening, the damper being arranged to be responsive to discharge of combustion products under the influence of said blower to move to open the discharge opening of said duct and being arranged to close said discharge opening in the absence of the influence of said blower.

* * * * *

UNITED STATES PATENT AND TRADEMARK OFFICE
CERTIFICATE OF CORRECTION

PATENT NO. : 4,271,789
DATED : June 9, 1981
INVENTOR(S) : Robert B. Black

It is certified that error appears in the above—identified patent and that said Letters Patent is hereby corrected as shown below:

Column 16, line 20 - change "outlet" to read --outside--.

Signed and Sealed this

Twenty-ninth Day of September 1981

[SEAL]

Attest:

GERALD J. MOSSINGHOFF

Attesting Officer

Commissioner of Patents and Trademarks